April 29, 1941.　　　K. STRATTON　　　2,239,796
TEMPERING GLASS TUBING
Filed March 22, 1938

INVENTOR.
KENNETH STRATTON
BY *Hovey, Colt & Garner*
ATTORNEYS.

Patented Apr. 29, 1941

2,239,796

UNITED STATES PATENT OFFICE 2,239,796

TEMPERING GLASS TUBING

Kenneth Stratton, Corning, N. Y., assignor to Corning Glass Works, Corning, N. Y., a corporation of New York Application March 22, 1938, Serial No. 197,467

13 Claims. (Cl. 49—45)

The present invention relates to methods of and apparatus for tempering glass articles after such articles have been suitably heated in preparation for their tempering treatment, by subjecting their surfaces to a cooling medium such, for example, as air or gas.

Tempering of flat and certain shaped ware by the foregoing method has heretofore been practiced to some extent. However, so far as applicant is aware, there is no prior art which teaches a method of tempering tubular bodies of small bore, the tempering of which bodies involves problems not encountered in the tempering of flat and shaped articles heretofore tempered by the air chilling method.

One object of the present invention is the tempering of tubular glass articles.

Another object is an apparatus suitable for tempering tubular glass articles of a wide range of lengths and which may also vary as to internal and external diameter.

The present invention embodies among its features; (1) means for supporting and rotating a tube to be tempered; (2) means to direct streams of a cooling medium into opposite ends of the tube and (3) means to direct streams of a cooling medium against the exterior surface of the tube.

The invention also embodies facilities for adjusting the foregoing apparatus to accommodate tubes of various lengths and diameters.

One form of apparatus suitable for practicing the invention is illustrated in the accompanying drawing in which.

Figure 1:
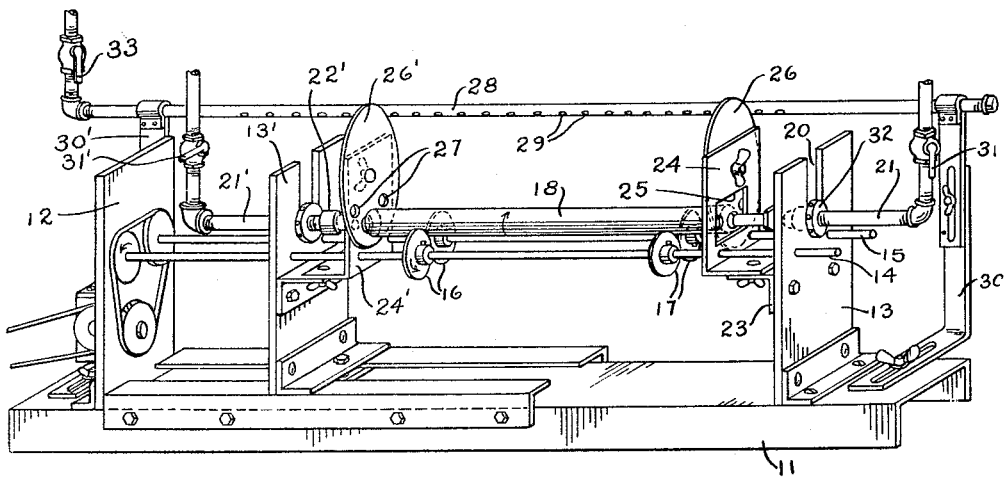
Fig. 1 is a perspective view of the apparatus.
Figure 2:
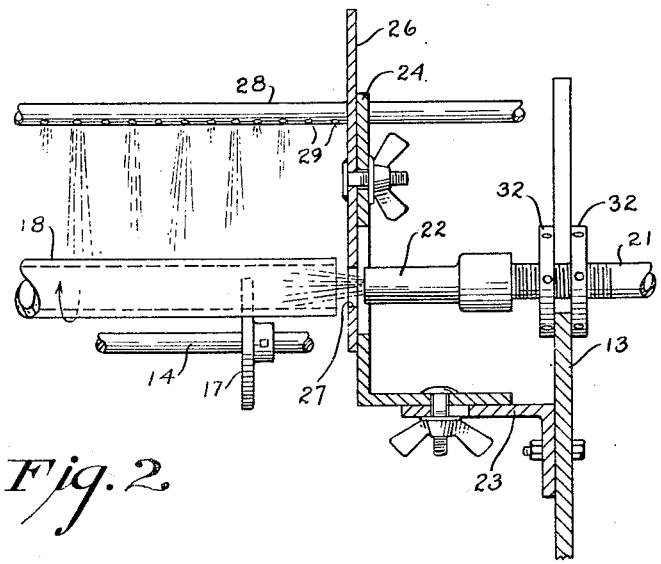
Fig. 2 is an enlarged side elevation, partly in section of a fragment of the apparatus more clearly bringing out certain constructional details thereof.

The apparatus includes a base 11 on which fixed upright end members 12 and 13 are mounted and which constitute supports for rotatable shafts 14 and 15. These shafts carry pairs of disks 16 and 17 which may be fixed at positions along the shafts suitable to best accommodate different lengths of tubes 18 to be tempered.

The upright member 13 has a slot 20 open at the top for accommodating cooling medium supply pipe line 21 containing a control valve 31 and having a nozzle 22 threaded thereon. The pipe 21 is held fixed with respect to the support by lock nuts 32 threaded thereon and arranged on either side of the support, thereby enabling the height of pipe 21 to be adjusted as required to bring the nozzle 22 into concentric alignment with any diameter of tube placed on disks 16 and 17. An angle iron 23, fixed to bracket 13, adjustably holds a second upright bracket 24 having a large cut-out 25 preventing its interference with the nozzle 22. This bracket in turn supports a tube stopping disk 26 having apertures 27 therein located different distances from its center, the distances being such that by rotation of the disk 26 one of the apertures 27 can always be brought into register with the bore of any tubular body to be tempered which has been placed on disks 16 and 17. A bracket 13' similar to bracket 13, but faced in the opposite direction and slidably arranged on base 11 carries a bracket 24', a disk 26' and a cooling medium supply line 21' provided with a nozzle 22', these parts being identical to parts 24, 26, 21, and 22 heretofore referred to. The bracket 13' is made slidable on base 11 in order that the space between brackets 13 and 13' can be conveniently adjusted to accommodate different length tubes 18. Arranged parallel to shafts 14 and 15 is a cooling medium supply pipe 28 equipped with a control valve 33 and having a row of apertures 29 therein. This pipe is supported on adjustable bracket assemblies 30 and 30' which enable the pipe to be moved vertically as well as horizontally relative to the shafts 14 and 15 into a position most suitable for directing a cooling medium to the outer surface of any particular diameter tube to be tempered. The pipe 28 can also be readily turned in its supports as necessary to direct the cooling medium at right angles or tangent to the surface of the tube.

In preparing for the tempering operation the respective parts are so adjusted that (a) the space between disks 26 and 26' is slightly greater than the length of the tube 18 to be tempered so that no difficulty will be had in placing tubes on disks 16 and 17 or in removing the tubes therefrom, (b) the disks 26 and 26' are then rotated as required to bring apertures 27 therein in register with a tube 18 placed on disks 16 and 17, (c) nozzles 22 and 22', having openings substantially of the diameter of the tubing bore, are threaded on pipes 21 and 21' and the pipes raised or lowered as required to bring their nozzle openings concentric to the tube bore, and (d) pipe 28 is adjusted in proper spaced relation to the tube and turned as required to properly direct a cooling medium toward the tube surface.

With a properly preheated tube 18 resting on disks 16 and 17 and being rotated thereby, valve 33 in supply line 28 is opened to permit a cooling medium supplied by pipe 28 to be directed toward the outer wall of the tube; and as rotation continues valves 31 and 31' in supply lines 21 and 21' are alternately opened and closed to alternately direct a cooling medium from their associated supply lines past the bore wall surfaces first from one end of the tube and then the other. Disk 26' at this time functions to prevent appreciable endwise movement of the tube to the left when valve 31 is open, while disk 26 prevents appreciable movement of the tube to the right while valve 31' is open. After the tube has been chilled for the desired time period the tube may be lifted from the disks, another placed thereon and the foregoing alternate operation of valves 31 and 31' continued.

I claim:

1. The method of tempering a tubular body of glass, which includes heating the glass to a selected temperature, rotating the body about an axis concentric to its bore and alternately introducing a cooling medium into opposite ends of the bore thereof.

2. The method of tempering a tubular body of glass, which includes heating the glass to a selected temperature, rotating the body about an axis concentric to its bore and alternately introducing a cooling medium into opposite ends of the bore and simultaneously directing streams of a cooling medium toward the outer wall surface of such body.

3. The method of treating a tubular body of glass, which includes heating the glass to a selected temperature, rotating the same about an axis concentric with the bore thereof and alternately directing a chilling medium into opposite ends thereof while sweeping its outer surfaces with a chilling medium.

4. The method of treating a tubular body of glass, which includes heating the glass to a selected temperature, rotating the same about an axis concentric with the bore thereof, and subjecting certain surfaces thereof to streams of chilling fluid flowing in a direction normal to the surface thereof while subjecting the oppositely disposed surfaces thereof to streams of fluid flowing in a direction parallel to the axis thereof.

5. An apparatus for tempering glass tubes, which includes rotatable disks for supporting a tube and for transmitting a rotary motion thereto, and chilling fluid supply conduits arranged at either end and wholly outside of a supported tube and having fluid supply openings in register with the bore of such tube.

6. An apparatus for tempering glass tubes, which includes rotatable disks for supporting a tube in rolling contact therewith, means for transmitting a rotary motion to said disks whereby rotation of a supported tube is effected, guide members for limiting the endwise movement of a supported tube, chilling fluid supply nozzles associated with said guide members having openings directed toward one another arranged to deliver fluid into the respective ends of the tube.

7. A tempering apparatus which includes rotatable members for supporting a tubular glass body in rolling contact therewith, nozzles for directing a cooling medium along the bore wall of the body in a direction parallel to the bore thereof, and means for centering said nozzles with respect to the bore of the body.

8. In a tempering apparatus, chilling fluid supply conduits, arranged in aligned spaced relation and having open ends facing one another, and means to support a tube in the space between said conduits with its bore in register with the open ends thereof.

9. In a tempering apparatus, chilling fluid supply conduits, arranged in aligned spaced relation and having open ends facing one another and means to support and rotate a tube in the space between said conduits with its bore in register with the open ends thereof.

10. In a tempering apparatus a pair of supports having chilling fluid supply conduits secured thereto arranged in aligned spaced relation and having open ends facing one another, rotating means for supporting a glass tube in the space between the open ends of said conduits with its bore in register therewith, and means for adjusting the height of the conduits as required to bring them into coaxial relation with any sized tube placed on said rotating means.

11. In a tempering apparatus a fixed support having a chilling fluid supply conduit having an open end mounted thereon, a movable support having a chilling fluid supply conduit mounted thereon having an open end directed toward the open end of the first mentioned conduit, and means for supporting a glass tube to be chilled between the open ends of said conduits with the bore of the tube in register with the open ends of said conduits, said movable support enabling the modification of the space between said conduits in accordance with the length of glass tube to be chilled.

12. The method of tempering a tubular body of glass, which includes heating the glass to a selected temperature, and alternately introducing a cooling medium into opposite ends of the bore thereof.

13. The method of treating a tubular body of glass, which includes heating the glass to a selected temperature, and alternately directing a chilling medium into opposite ends thereof while sweeping its outer surface with a chilling medium.

KENNETH STRATTON.